US006923056B2

(12) United States Patent
Urquidi

(10) Patent No.: US 6,923,056 B2
(45) Date of Patent: Aug. 2, 2005

(54) RESONANT NETWORK FLUID LEVEL SENSOR ASSEMBLY

(75) Inventor: Carlos A. Urquidi, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 34 days.

(21) Appl. No.: 10/683,230

(22) Filed: Oct. 10, 2003

(65) Prior Publication Data

US 2005/0076711 A1  Apr. 14, 2005

(51) Int. Cl.⁷ ............................................. G01F 23/26
(52) U.S. Cl. ................................ 73/304 C; 73/304 R
(58) Field of Search .......................... 73/304 C, 304 R

(56) References Cited

U.S. PATENT DOCUMENTS

| | | | | |
|---|---|---|---|---|
| 3,301,056 A | * | 1/1967 | Blanchard et al. | 73/304 C |
| 3,343,415 A | * | 9/1967 | Johnston | 73/304 C |
| 4,003,259 A | * | 1/1977 | Hope | 73/304 C |
| 4,674,329 A | * | 6/1987 | Mulder | 73/304 C |
| 5,142,909 A | * | 9/1992 | Baughman | 73/304 C |
| 5,423,214 A | * | 6/1995 | Lee | 73/304 C |
| 5,613,399 A | * | 3/1997 | Hannan et al. | 73/304 C |
| 5,747,689 A | * | 5/1998 | Hampo et al. | 73/304 C |
| 6,138,508 A | * | 10/2000 | Hannan et al. | 73/304 C |
| 6,293,145 B1 | * | 9/2001 | Wallrafen | 73/304 C |
| 6,564,630 B1 | * | 5/2003 | Klemp | 73/304 C |

* cited by examiner

Primary Examiner—Michael Cygan
(74) Attorney, Agent, or Firm—Jimmy L. Funke

(57) ABSTRACT

A sensing assembly (10) senses liquid levels (14) in a reservoir (12) and creates a sensing signal (54) therefore. The sensing assembly (10) includes a first electrical conductor (22) extending into the reservoir (12). A second electrical conductor (24) also extends into the reservoir (12) and is disposed from the first electrical conductor (22) a predetermined distance. A first electrode (28) is electrically connected to the first electrical conductor (22). The first electrode (28) extends between a first conductor end (30) and a first distal end (32). A first electrode length (34) is defined therebetween. A second electrode (36) is electrically connected to the second electrode conductor (24). The second (36) electrode is spaced apart from the first electrode (28) and extends between a second conductor end (38) and a second distal end (40). A second electrode length (42) is defined therebetween. The sensing assembly (10) also includes a plurality of plates (44) that are operatively connected to the second electrode (36). The plurality of plates (44) are spaced equidistantly along the second electrode length (42). Each of the plurality of plates (44) combines with the first electrode (28) to create a unique capacitance such that the sensing signal (54) generating by the sensing assembly (10) determines the level (14) of the liquid (16) in the reservoir (12).

11 Claims, 5 Drawing Sheets

RESONANT NETWORK FLUID LEVEL SENSOR ASSEMBLY

BACKGROUND ART

1. Field of the Invention

The invention relates to fluid level sensing assemblies. More particularly, the invention relates to resonant fluid level sensing assemblies capable of accurately determining the level of a fluid within a reservoir by analyzing the resonance of the output signal of the fluid level sensing assembly.

2. Description of the Related Art

The storage and delivery of liquids is an important feature of many mechanisms. In an automotive environment, proper delivery of liquids is essential for the functioning and maintenance of a motor vehicle. By way of example, a motor vehicle will not function without fuel, typically liquid gasoline. That same motor vehicle will not function properly without the proper amount of oil stored in the internal combustion engine allowing it to lubricate and cool itself. These are just two fluids in a particular environment that require close observation to make sure its host mechanism, i.e., the motor vehicle, can operate properly.

Currently, there are a number of ways in which a fluid level may be measured. The mechanisms used to measure the fluid level help determine if more fluid is required in order to continue the proper maintenance and operation of the host mechanism. Fluid level measuring mechanisms include floating arm mechanisms, pressure sensors, capacitive sensors, and ultrasonic sensors. The most commonly used fluid level measuring system is the floating arm mechanism.

The floating arm mechanism is an imperfect mechanism for several reasons. First, the floating arm mechanism requires moving parts inside a liquid-filled container. This requires increased time to install the floating arm mechanism and seal it and the container or reservoir. Resistive strips used by the floating arm mechanism are susceptible to contamination and can develop contact problems. The contamination and contact problems result in erroneous measurements. Looking forward, the floating arm fluid measuring mechanism will not be able to differentiate between different types of liquids within the same reservoir. This problem will increase in the automotive environment as different types of fuels will be accepted by each motor vehicle resulting in the stratification of the fluids within a particular reservoir.

Another reason the floating arm mechanisms are inferior is that they measure liquid levels inefficiently when the reservoir holding the liquid is unusually shaped. Oftentimes when a motor vehicle is an all-wheel drive vehicle, an extra drive shaft is required to extend along the underbody of the motor vehicle. The extra shaft typically extends through the space used by the fuel tank. Therefore, the fuel tank must be modified resulting in an unusually shaped fuel tank. Multiple floating arm mechanisms are required to get accurate readings from these unusually shaped fuel tanks. This adds considerable costs to the fuel tank construction.

SUMMARY OF THE INVENTION

A sensing assembly senses liquid levels in a reservoir and creates a sensing signal therefore. The sensing assembly includes a first electrical conductor extending into the reservoir. A second electrical conductor also extends into the reservoir and is disposed from the first electrical conductor a predetermined distance. A first electrode is electrically connected to the first electrical conductor. The first electrode extends between a first conductor end and a first distal end. A first electrode length is defined therebetween. A second electrode is electrically connected to the second electrical conductor. The second electrode is spaced apart from the first electrode and extends between a second conductor end and a second distal end. A second electrode length is defined therebetween. The sensing assembly also includes a plurality of plates that are operatively connected to the second electrode. The plurality of plates are spaced equidistantly along the second electrode length. Each of the plurality of plates combines with the first electrode to create a unique capacitance such that the sensing signal generating by the sensing assembly determines the level of the liquid in the reservoir.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
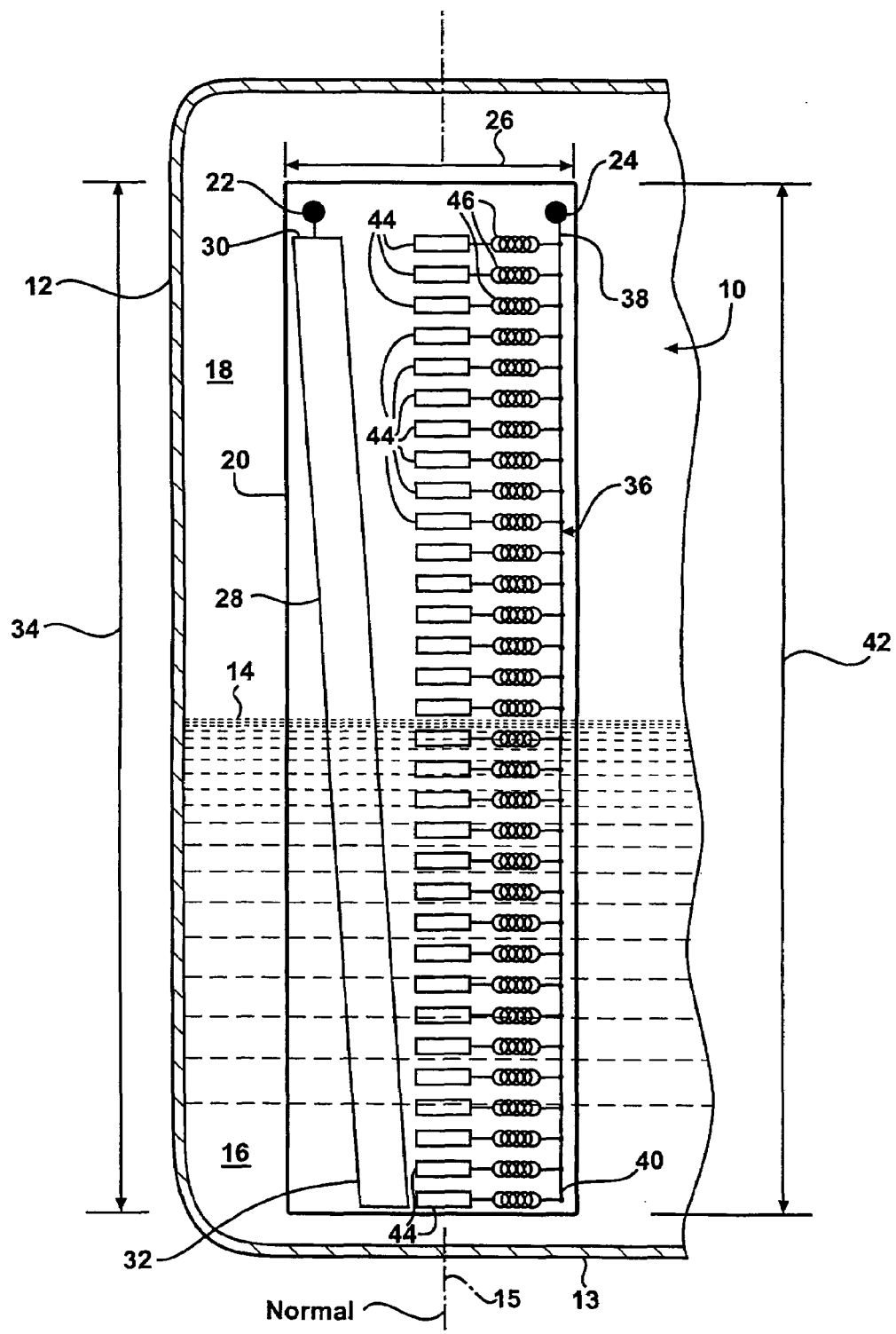
FIG. 1 is a side view of one embodiment of the invention in a reservoir, shown in cross section, that is partially filled with a liquid.

Referring to FIG. 1, the invention, a sensing assembly, is generally indicated at 10. The sensing assembly senses liquid levels in a reservoir 12. The sensing assembly 10 creates a sensing signal 54 (shown in FIGS. 3 and 4) to identify a level 14 that the liquid 16 is at within the reservoir 12. A sensing assembly 10 is designed such that it is presumed that air 18 fills the portion of the reservoir 12 that the liquid 16 does not. While it is contemplated that the embodiment shown in the Figures illustrates a sensing assembly 10 for a fuel tank 12 of a motor vehicle, it should be appreciated that the reservoir 12 may be any reservoir designed to hold a liquid 16 therein.

The reservoir 12 includes a bottom surface 13 that defines a normal 15 extending up therefrom. In the instance when the bottom surface 13 does not extend through a single plane parallel to the horizon, the normal 15 will be treated as though it is extending normal to the horizon. Therefore, the surface of the liquid 16 is always perpendicular to the normal 15.

A sensing assembly includes a base 20. The base 20 is a rectangular piece of material that is capable of having electronics fixedly secured thereto. In addition, the base 20 is fabricated of a material that does not corrode with exposure to either air 18 or the liquid 16 contemplated to be stored within the reservoir 12. The base 20 is mountable to the reservoir allowing it to be secured in a predetermined position within the reservoir 12.

The sensing assembly 10 also includes a first electrical conductor 22 and a second electrical conductor 24. The first 22 and second 24 electrical conductors extend into the reservoir 12. These electrical conductors 22, 24 allow the sensing assembly 10 to be connected to a control circuit (not shown) that creates a signal which is modified by the sensing assembly 10. The second electrical conductor 24 is disposed from the first electrical conductor 22 a predetermined distance. It should be appreciated by those skilled in the art that the lead configuration for the electrical conductors 22, 24 may change at some point within the reservoir 12 based on design requirements.

Extending down along the base 20 is a first electrode 28. The first electrode 28 is electrically connected to the first electrical conductor 22. The first electrode 28 extends between a first conductor end 30 and a first distal end 32. The first electrode 28 defines a first electrode length 34 extending therebetween. As is shown in FIG. 1, the first electrode 28 is an elongated, continuous plate of conductive material wherein the first electrode length 34 is greater than its width.

The sensing assembly 10 also includes a second electrode 36. The second electrode 36 is electrically connected to the second electrical conductor 24. The second electrode 36 is an elongated conductor that extends between a second conductor end 38 and a second distal end 40. The second electrode 36 is spaced apart from the first electrode 28. The second electrode 36 defines a second electrode length 42 that extends between the second conductor end 38 and the second distal end 40. The second electrode 36 also is fixedly secured to the base 20 and extends therealong.

A plurality of plates 44 extend along the base 20 and are fixedly secured thereto. The plurality of plates 44 are positioned between the first electrode 28 and the second electrode 36. Each of the plurality of plates 44 are equal in size and are coplanar. Each of the plurality of plates 44 is operatively connected to the second electrode 36 such that each of the plurality of plates 44 is electrically connected to the second electrode 36. This electrical connection includes an inductor 46. The inductors 46 are connected between each of the plurality of plates 44 and the second electrode 36 such that the inductors 46 and the plurality of plates 44 are connected in series with respect to the second electrode 36.

Figure 2:
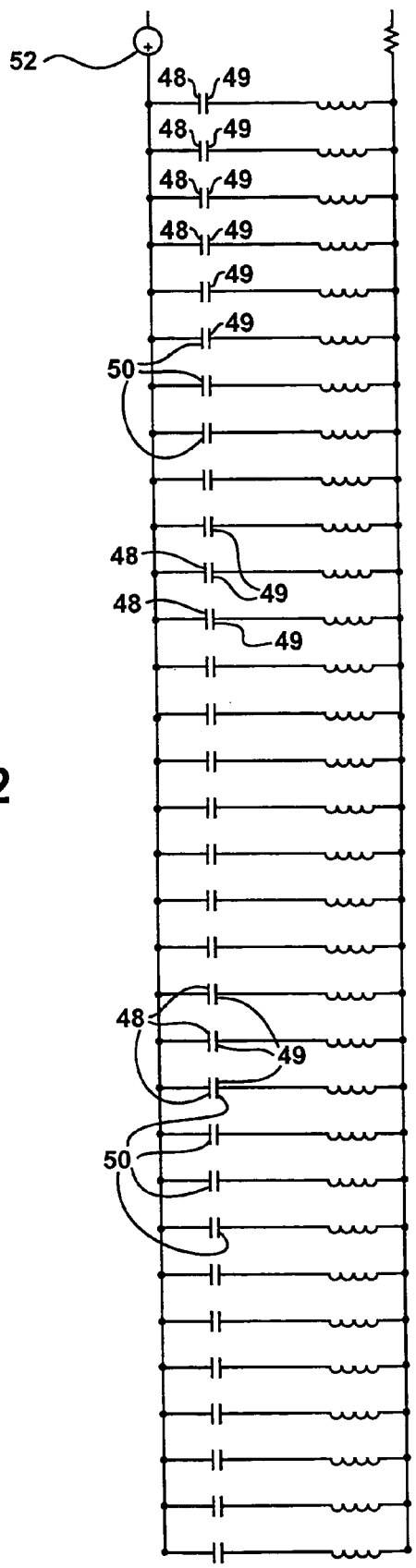
FIG. 2 is an electrical schematic of one embodiment of the invention.

In operation, the sensing assembly 10 uses each of the plurality of plates 44 and the first electrode 28 to create a plurality of capacitances by having the first electrode 28 act as a plurality of first plates 48 (FIG. 2) and each of the plurality of plates 44 acting as second plates 49 for capacitors 50. A signal is generated by a signal generator 52 and the control circuit identifies the level 14 of the liquid 16 by how the signal generated by the signal generator 52 is modified by the sensing assembly 10. This operation will be discussed in greater detail subsequently.

Referring again to FIG. 1, the preferred embodiment of the sensing assembly 10 has the first electrode 28 extending down the base 20 at an angle with respect to the normal 15 of the reservoir 12. The first electrode 28 extends at an acute angle with respect to the normal 15, which allows the portion of the first electrode 28 disposed adjacent the second distal end 40 of the second electrode 36 to be closer to the plates 44. Continuing with this, the first electrode 28 is further from the plates 44 disposed adjacent the second conductor end 38 of the second electrode 36. By position the second electrode 36 in such a manner, the capacitances for the capacitors 50 that are closer to the distal ends 32, 40 of the electrodes 28, 36 are greater than those disposed the first 30 and second 38 conductor ends.

Figure 3:
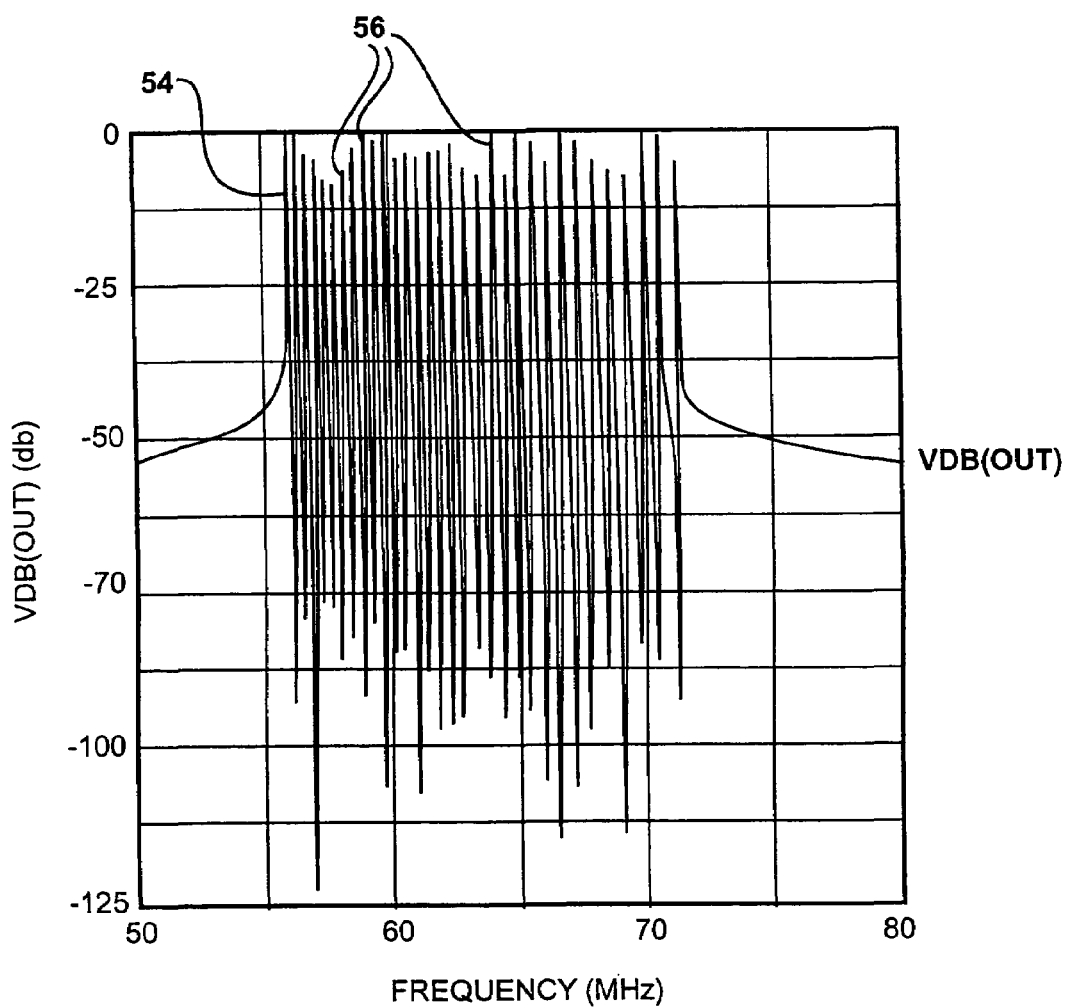
FIG. 3 is a graphic representation of an output of the sensing assembly when the reservoir is empty.

Referring to FIG. 3, a graph representing the sensing signal 54 as seen by the control unit is shown. In the example of the embodiment shown in FIGS. 1 and 2, there are 32 capacitors 50 created between the first electrode 28 and each of the 32 plurality of plates 44. It should be appreciated that any number of capacitors 50 may be created based on the design specifications and the accuracy requirements for a particular reservoir 12.

Returning attention to FIG. 3, there are 32 spikes 56 in the sensing signal 54 which represents an output from each of the 32 capacitors 50. Because the first electrode 28 extends along the base 20 at an angle with respect to each of the plurality of plates 44, each capacitor 50 has its own resonant frequency. In the example shown in FIGS. 1 and 2, each of the inductors 46 has an equal inductance of 100 micro henries. With the total capacitance of the capacitors 50 being 1.6 pico farads, each capacitor 50 has an approximate value of 50 femto farads.

Based on these values, a frequency range for the spikes 56 extends between 50 MHz and 75 MHz when there is no liquid 16 in the reservoir 12. This frequency range is used as a calibration for the sensing assembly 10. More specifically, when the reservoir 12 is filled with air 18 and void of any liquid, the output of each of the capacitor/inductor pairs resides within the 50–75 MHz range. It should be appreciated that the distribution of the spikes 56 is not even and is dependent on the liquid that is poured into the reservoir 12.

Figure 4:
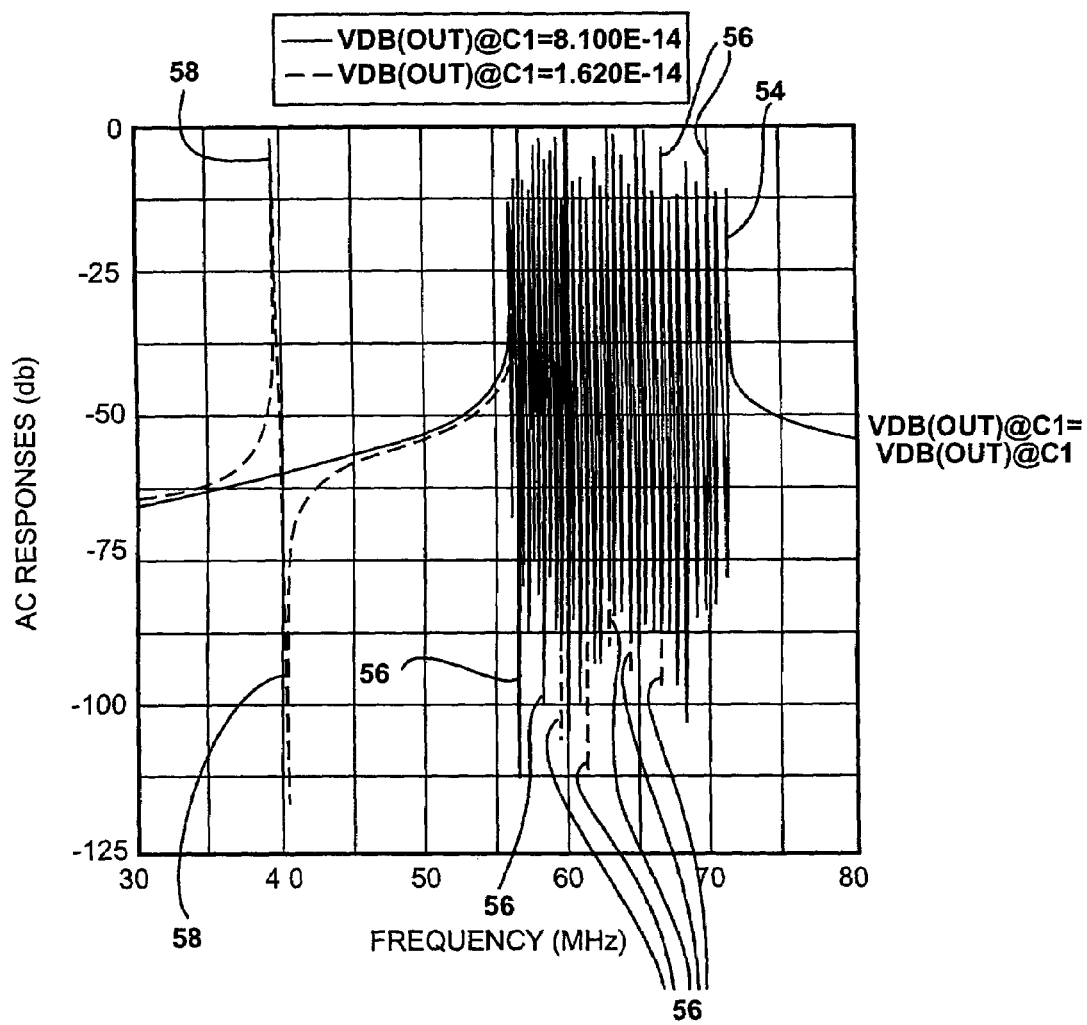
FIG. 4 is a graph representation of an output of the sensing assembly when the reservoir has some liquid therein.

Referring to FIG. 4, it can be seen that one 58 of the spikes 56 has shifted outside the calibration range of 50–75 MHz. This spike 56 is created by the capacitor/inductor pair disposed adjacent the bottom surface 13 of the reservoir 12 as the reservoir 12 is filled with liquid 16. As the liquid 16 takes up more space in the reservoir 12, the level 14 rises. As the level 14 rises, the capacitance of each of the capacitance 50 is effected resulting in a shift in frequency of the capacitor/inductor pairs. This shift in frequency is illustrated in FIG. 4. The control circuit receives the signal and is capable of identifying how many spikes 56 have shifted outside its calibrated frequency range. By identifying how many spikes 56 have shifted, it can be determined the level 14 at which the liquid 16 is within the reservoir 12.

Figure 5:
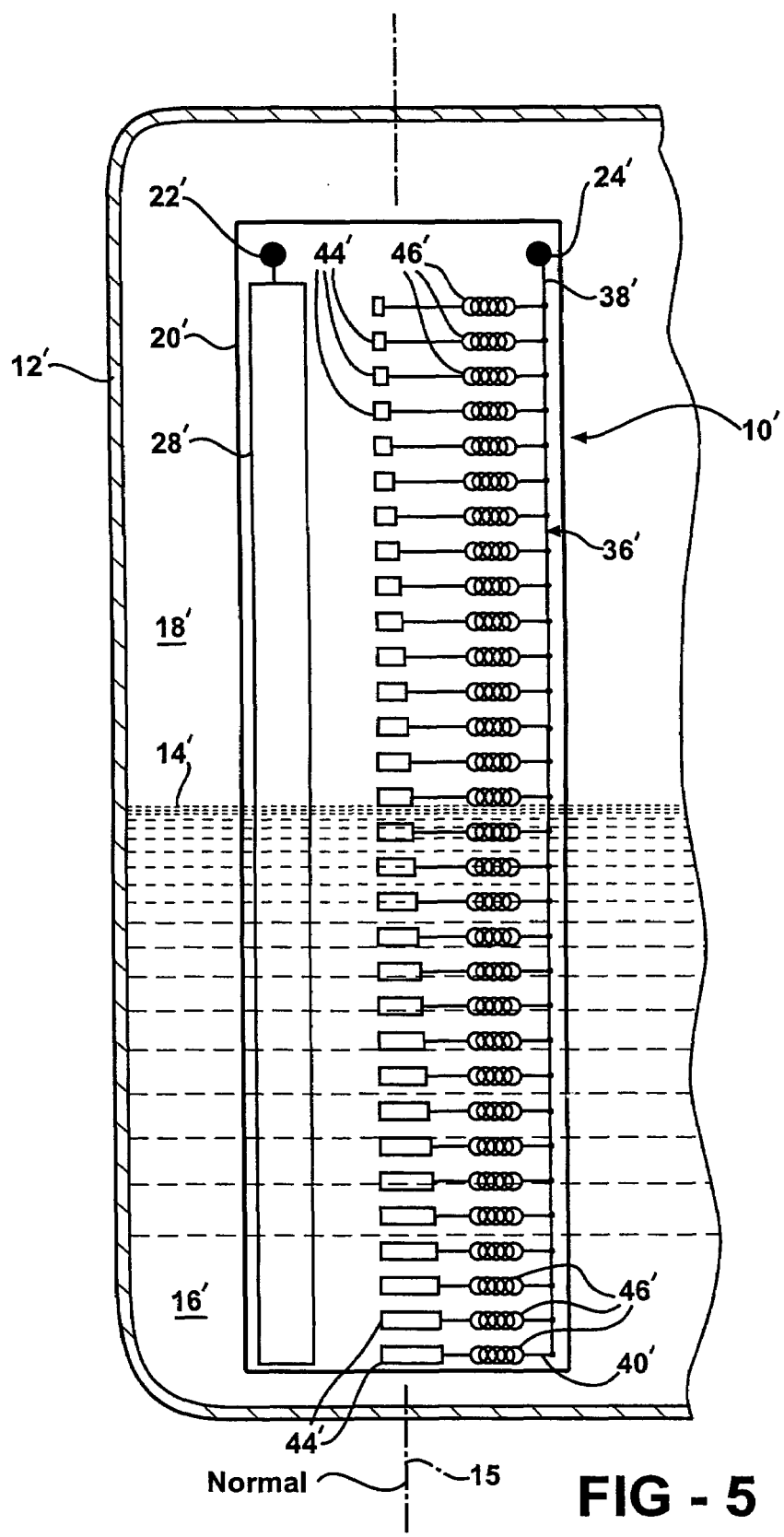
FIG. 5 is a side view of an alternative embodiment of the invention.

Referring to FIG. 5, an alternative embodiment is generally shown with elements similar to that of the preferred embodiment represented by prime like numerals. In this embodiment, the first electrode 28' extend along the base 20' parallel to the normal 15' of the reservoir 12'. Therefore, the first electrode 28' is spaced equidistantly from the plurality of plates 44'. Another difference in this alternative embodiment from the preferred embodiment is that each of the plurality of plates 44' has a distinct and different size from the other of the plurality of plates 44'. In order to make sure the capacitances and the shifting capacitances due to the presence of a liquid 16' in the reservoir 12', the plates 44' disposed adjacent the second distal end 40' are larger than those disposed adjacent the second conductor end 38'. The size of the plates 44' gradually decrease in area as the plates 44' get closer to the second conductor end 38'.

In both embodiments, the configurations are chosen such that the capacitances of the capacitor/inductor pairs increases as a function of their proximity to the bottom surface 13 of the reservoir 12. By having the capacitances increase as the capacitors 50 get closer to the bottom surface allows for the frequency of that specific spike 56 to not overlap or get lost within other spikes within calibrated range as liquid becomes present within the reservoir 12. More specifically, the presence of the liquid 16 shifts the resonant frequency of a particular capacitor/inductor pair to a lower frequency. Therefore, as the first capacitor/inductor pair is covered with the liquid, it would be the first spike 56 to shift to a lower frequency. And, by having the larger capacitance for the bottom most capacitance/inductor pair allows the spike 56 associated with that capacitor/inductor pair to shift to a region free of any other spikes, regardless of how much the frequency changes due to the presence of the liquid at that particular level. Again, the distribution of the spikes 58 that eventually shift based on the filling of the reservoir 12 does not result in an even distribution of the shifted spikes as the amount of frequency shift of each spike 56 is dependent on the type of fluid that is being poured into the reservoir 12.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed:

1. A sensing assembly for sensing liquid levels in a reservoir and for creating a sensing signal therefore, said sensing assembly comprising:

a first electrical conductor extending into the reservoir;

a second electrical conductor extending into the reservoir and disposed from said first electrical conductor a predetermined distance;

a first electrode electrically connected to said first electrical conductor, said first electrode extending between a first conductor end and a first distal end and defining a first electrode length therebetween;

a second electrode electrically connected to said second electrical conductor, said second electrode spaced apart from said first electrode and extending between a second conductor end and a second distal end defining a second electrode length therebetween, said first electrode disposed at an angle with respect to said second electrode; and a plurality of plates operatively connected to said second electrode spaced equidistantly therealong and extending out from said second electrode toward said first electrode such that each of said plurality of plates is disposed a distance from said first electrode differing from the other of said plurality of plates, each of said plurality of plates combine with said first electrode to create a unique capacitance wherein the sensing signal generated by said sensing assembly determines the level of the liquid in the reservoir.

2. A sensing assembly as set forth in claim 1 wherein said first electrode and said plurality of plates are coplanar.

3. A sensing assembly as set forth in claim 2 wherein each of said plurality of plates is equal in size.

4. A sensing assembly as set forth in claim 3 including a plurality of inductors, each electrically connected to each of said plurality of plates.

5. A sensing assembly as set forth in claim 4 wherein each of said plurality of inductors is serially connected between each of said plurality of plates and said second electrode.

6. A sensing assembly as set forth in claim 1 wherein said first electrode is spaced from each of said plurality of plates equidistantly.

7. A sensing assembly as set forth in claim 6 wherein each of said plurality of plates define a size different from each other of said plurality of plates.

8. A sensing assembly as set forth in claim 7 wherein said first electrode and said plurality of plates are coplanar.

9. A sensing assembly as set forth in claim 8 including a plurality of inductors, each electrically connected to each of said plurality of plates.

10. A sensing assembly as set forth in claim 9 wherein each of said plurality of inductors is serially connected between each of said plurality of plates and said second electrode.

11. A sensing assembly as set forth in claim 1 wherein each of said plurality of plates define a size different from each other of said plurality of plates.

* * * * *